United States Patent [19]

Lansdowne

[11] Patent Number: 5,758,278
[45] Date of Patent: May 26, 1998

[54] METHOD AND APPARATUS FOR PERIODICALLY RE-ACTIVATING A MOBILE TELEPHONE SYSTEM CLOCK PRIOR TO RECEIVING POLLING SIGNALS

[75] Inventor: Richard Lansdowne, Hampshire, England

[73] Assignee: Nokia Mobile Phones Limited, Salo, Finland

[21] Appl. No.: 595,976

[22] Filed: Feb. 6, 1996

[30] Foreign Application Priority Data

Feb. 7, 1995 [GB] United Kingdom ............... 9502380

[51] Int. Cl.⁶ .................................................. H04B 1/16
[52] U.S. Cl. ................ 455/343; 455/574; 340/825.44
[58] Field of Search ........................... 455/38.3, 127, 455/343, 574; 340/825.44; 370/311

[56] References Cited

U.S. PATENT DOCUMENTS

| | | | |
|---|---|---|---|
| 4,305,041 | 12/1981 | Frerking | 328/155 |
| 5,187,471 | 2/1993 | Wagai et al. | 455/343 X |
| 5,428,820 | 6/1995 | Okada et al. | 455/38.3 |
| 5,448,755 | 9/1995 | Tanaka | 455/38.3 |

FOREIGN PATENT DOCUMENTS

| | | |
|---|---|---|
| 0305200 A2 | 3/1989 | European Pat. Off. |
| 0 351 230 A2 | 1/1990 | European Pat. Off. |
| 0461849 A2 | 12/1991 | European Pat. Off. |
| 0 499 440 A2 | 8/1992 | European Pat. Off. |
| 0 509 649 A2 | 10/1992 | European Pat. Off. |
| 0 560 320 A1 | 9/1993 | European Pat. Off. |
| 0 586 256 A2 | 3/1994 | European Pat. Off. |
| 0619685 A2 | 10/1994 | European Pat. Off. |
| 0622966 A1 | 11/1994 | European Pat. Off. |
| 1410396 | 10/1975 | United Kingdom . |
| 2019054 | 10/1979 | United Kingdom . |
| 2167254 | 5/1986 | United Kingdom . |
| WO 91/16670 | 10/1991 | WIPO . |
| WO 95 10141 | 4/1995 | WIPO . |

*Primary Examiner*—Chi H. Pham
*Attorney, Agent, or Firm*—Perman & Green, LLP

[57] ABSTRACT

A mobile telephone has a high frequency system clock and processing means. In a stand-by condition, when the telephone is not being used as such but is ready to receive incoming calls, polling signals are processed during a predetermined portion of a repeated periodic cycle. After completing cycle processing, the system clock is de-activated. However, it is not necessary to calculate a de-activation period. Re-activation occurs at a predetermined position within the repeated periodic cycle in anticipation of receiving the next polling signals.

18 Claims, 3 Drawing Sheets

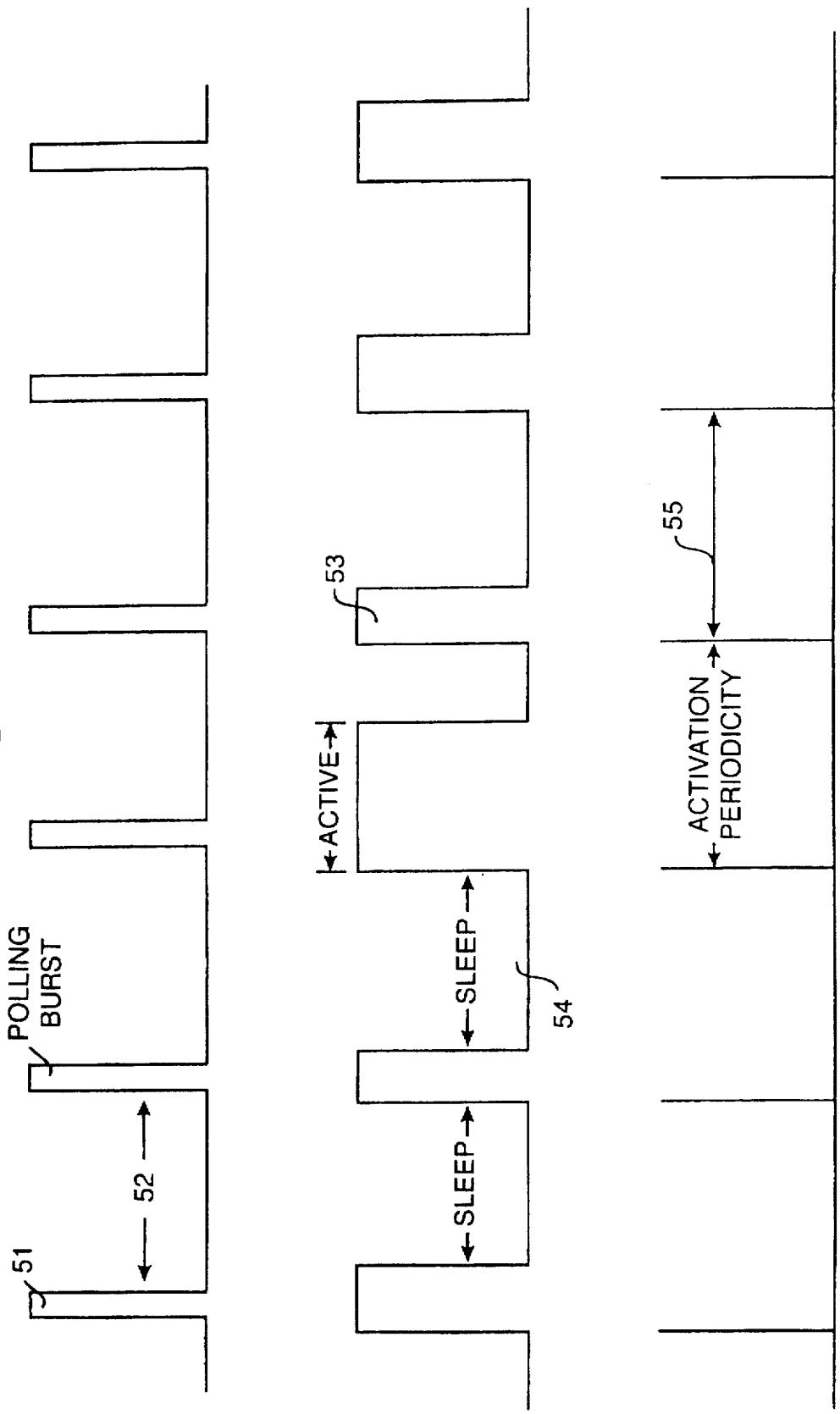

METHOD AND APPARATUS FOR PERIODICALLY RE-ACTIVATING A MOBILE TELEPHONE SYSTEM CLOCK PRIOR TO RECEIVING POLLING SIGNALS

BACKGROUND OF THE INVENTION

The present invention relates to a radio telephone having a high frequency system clock and processing means. In particular, the present invention relates to a radio telephone in which said processing means is arranged to process polling signals received during a predetermined portion of a repeated periodic cycle.

In digital mobile telephones, a highly accurate high frequency system clock produces a clock signal at a frequency in the tens of megahertz. During a communicating mode of operation, the clocking signal is required continuously, so as to accurately align transmitted data and received data within a time and frequency multiplex established by an operating network.

A problem with mobile telephones of this type is that the processing circuitry demands significant levels of battery power, therefore it is desirable to de-activate this circuitry when it is not actually required. In many situations, de-activation periods may be assessed with reference to a predetermined count of system clock pulses. However, given the high frequency of the system clock, this in itself represents a component which places significant demands upon the power supply and, preferably, it would be desirable to de-activate the system clock when it is not actually required. Clearly, this creates a problem, given that, under normal circumstances, it would be the system clock itself which provided a measure of de-activation periods.

European Patent Publication No. 0 586 256 discloses a mobile telephone in which a relatively low quality, low frequency clock is provided in addition to the high frequency system clock. A system clock is used to determine the accuracy and stability of the low frequency clock, hence allowing said clock to be calibrated with reference to the system clock. It is then possible to de-activate the system clock for predetermined durations, during which said clock may be referred to as entering a "sleep mode". The duration is measured with reference to the low frequency "sleep clock", whereafter the high frequency system clock is re-activated for the subsequent processing of data.

Thus, in this way, it is possible for the system clock to be de-activated when the telephone is in its stand-by condition. The system clock is required to be re-activated in anticipation of receiving polling signals, contained within a specific polling frame within each superframe. Thereafter, a sleep duration may be assessed and measured by counting pulses generated by the sleep clock. Thereafter, the system clock is re-activated in anticipation of receiving the next burst of polling signals.

A problem with this known proposal is that the system clock cannot be de-activated until it has completed its processing activities for that particular cycle. Given that the number of activities to be performed tends to be variable, the duration over which the system clock remains active will vary between cycles. Consequently, the maximum sleep duration will also vary from one cycle to the next. A first possible solution would be to assess the minimum sleep duration and sleep for this period on each cycle, thereby providing sufficient time for the processor to complete processing activities for that cycle. Clearly, a disadvantage of this approach is that the sleep durations are not optimised, thereby resulting in the system clock remaining active at times when it could have been switched off.

An alternative solution would be to re-calculate the sleep duration for each cycle, thereby optimising the duration of the sleep period and optimising battery conservation. A problem with this approach is that an additional routine must be included to calculate the sleep duration. This creates a significant problem in that the calculation of the sleep duration becomes another process which must be performed by the processor before it can be placed in its sleep condition. Thus, an estimate has to be made as to the point at which the processor can be placed into its sleep condition, such that sufficient time is provided for the calculation to be executed for the calculation of the sleep duration. Thus, a tolerance band must be included which in turn results in non-optimisation of the sleep duration. Furthermore, the calculation of sleep duration also adds an additional burden and requires additional power consumption.

SUMMARY OF THE INVENTION

According to a first aspect of the present invention, there is provided a mobile telephone having a high frequency system clock and processing means, wherein said processing means is arranged to process polling signals received during a predetermined portion of a repeated periodic cycle, comprising means for de-activating said system clock after completing cycle processing, and means for re-activating said system clock at a predetermined position within said repeated periodic cycle in anticipation of receiving polling signals.

Thus, in accordance with the present invention, it is not necessary for the system clock to calculate said sleep durations. Re-activation of the system clock occurs at a predetermined position within the repeated periodic cycle and occurs at a point, anticipating the reception of polling signals, such that the system is in an active and stable condition when the polling signals are received.

An advantage of the present invention is that the system clock can be placed in its sleep condition as soon as the cycle processing, i.e. processing required for that particular cycle, has been completed. It is not necessary to calculate a sleep duration. The system is re-activated with reference to the repeated cycle, not the end of a sleep duration, thereby significantly improving sleep duration optimisation while at the same time reducing processing overhead.

In a preferred embodiment, a system clock oscillates at a frequency of between 5 megahertz and 20 megahertz. Preferably, polling signals are received during the predetermined frame of a superframe multiplex and each superframe may include from ten to fifty frame periods.

Preferably, the system clock is deactivated when the telephone is in a standby condition ready to receive incoming calls. Preferably, the predetermined position within the repeated periodic cycle is determined with reference to a low frequency sleep clock. The predetermined number of sleep clock pulses may be counted to produce reactivation signals and the sleep clock may be calibrated with reference to the system clock and with reference to timing signals received from base stations.

BRIEF DESCRIPTION OF THE DRAWINGS

The invention will now be described by way of example only, with reference to the accompanying drawings, in which:

FIG. 5 shows a timing diagram of polling bursts and activation periods.

DETAILED DESCRIPTION OF THE INVENTION

Figure 1:
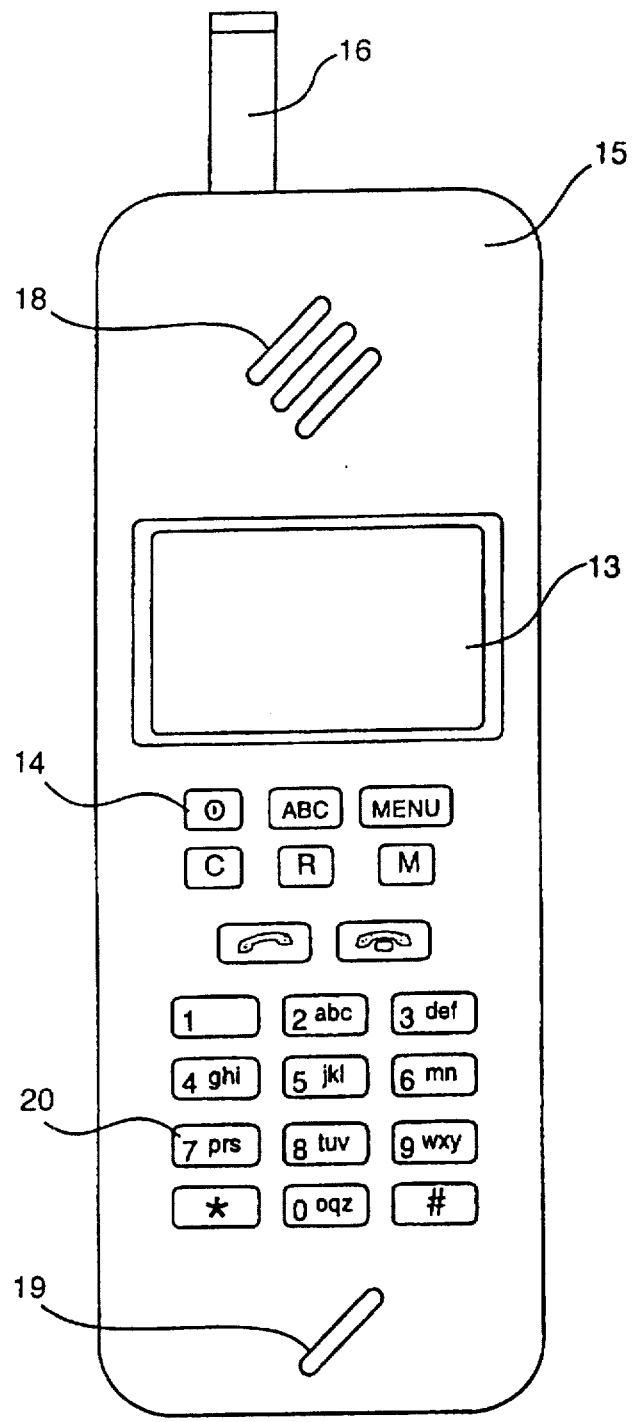
FIG. 1 shows a digital mobile telephone arranged to communicate with base stations using a frame structure to facilitate time division multiplexing.

A mobile telephone is shown in FIG. 1, contained within a plastic housing 15, with an antenna 16 extending from said housing to facilitate communication between the mobile telephone and cellular base stations. The telephone includes an earpiece 18 and a microphone 19, along with manually operable keys 20 and a liquid crystal display 13.

The telephone includes an on/off switch 14 such that, when not required, the telephone may be switched off so as to conserve battery power. A nickel-cadmium battery pack is attachable to the rear of the telephone and the ability to conserve battery power will significantly affect the duration between battery re-charging or battery replacement.

When switched on, by operation of switch 14, the telephone has essentially two modes of operation. In a first mode, the telephone is placed in a stand-by condition. In this stand-by condition, the telephone is not usable as such but remains active, so that it is receptive to polling signals transmitted by base stations. Furthermore, it is also in a condition responsive to manual key operation. Thus, in its stand-by condition, the telephone is effectively waiting for a call to be established by the telephone user or by someone wishing to contact the telephone user.

When a call is set up either by the telephone user or by someone calling the user, the telephone must enter its second mode of operation, under which communication channels are established between the telephone and a cellular base station. The telephone communicates with base stations using an encoded digital time-multiplex, in which an allocated transmission frequency band is divided, over time, into a plurality of channel frames.

In its stand-by condition, it is not necessary for the mobile telephone to have channel bandwidth allocated thereto but, as previously stated, it is necessary for the telephone to receive polling signals from base stations, so that the telephone may be polled when a calling party attempts to establish a communication channel to the telephone.

The actual division of communication links into channel frames and the sub-division of these frames into data symbols involves a number of parameters which are selectable for particular communication standards and, to some extent, adjustable within these standards. Thus, a telephone may be programmed to be adaptable, such that the fully defined mode of operation is determined by a network, which in turn communicates with the mobile telephone so as to complete its programming for operation within that network. It should therefore be understood that many of the numerical values given in the following disclosure are only examples and that many modifications could be made while still falling within the scope of the present invention.

An operational network will have a plurality of radio frequencies allocated thereto and the total number of frequencies will determine the total number of calls which may be simultaneously connected within each particular cell. In addition to providing actual communication between mobile telephones and base stations, it is also necessary to transmit signalling commands, so as to facilitate the connection of calls and the switching of communications between base stations. The signalling instructions are also transmitted using the frame structure, therefore some frames will have a different character to that of others. It is necessary for the system, at any particular time, to be aware of the type of frame that is being transmitted, therefore the frame structure is repeated in a predictable way. Thus, each transmitted frame contains a fixed number of data symbols and a predetermined number of these frames constitute the total period of a repeated cycle.

Figure 2:
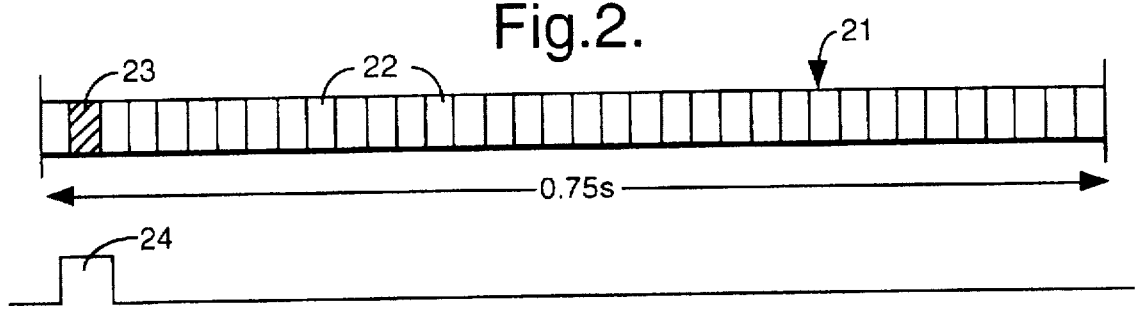
FIG. 2 illustrates a frame structure, consisting of thirty six repeated frames.

A group of repeated frames is referred to as a superframe or multiframe and a superframe structure 21 for the present embodiment is shown in FIG. 2. The superframe is transmitted over 720 milliseconds and includes a total of thirty six frames 22. Frame 23, shown shaded in FIG. 2, includes polling information which may be considered as a burst of information identifying unique numbers for particular mobile telephones, thereby identifying telephones which are being called and require a call to be answered. Thus, when a mobile telephone is not actually communicating with a base station, a significant proportion of its operating circuitry may be de-activated so as to reduce power consumption. However, it is essential that, within each superframe, the telephone is capable of analysing information transmitted during each polling frame.

Figure 3:
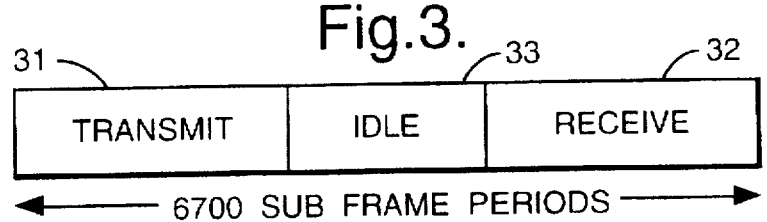
FIG. 3 shows the division of each of the frames illustrated in FIG. 2 into transmission and reception portions.

A frame 22 is detailed in FIG. 3 and consists of 6720 sub-frame periods. The sub-frame period frequency defines the output sample rate, therefore it is necessary for the output digital circuitry to produce an output value at the sub-frame period rate and, similarly, input signals are sampled at this rate. As shown in FIG. 3, each frame includes a transmit portion 31 and a receive portion 32, separated by an idle portion 33. Thus, during the transmit portion 31 data is transmitted from the mobile telephone to a base station at the sub-frame rate while, similarly, during the receive portion, data is received by the mobile telephone at this rate. Thus, the whole system operates within an accurately synchronised environment in which the clocking of signals within each mobile telephone must be synchronised to clocking signals generated by base stations.

Figure 4:
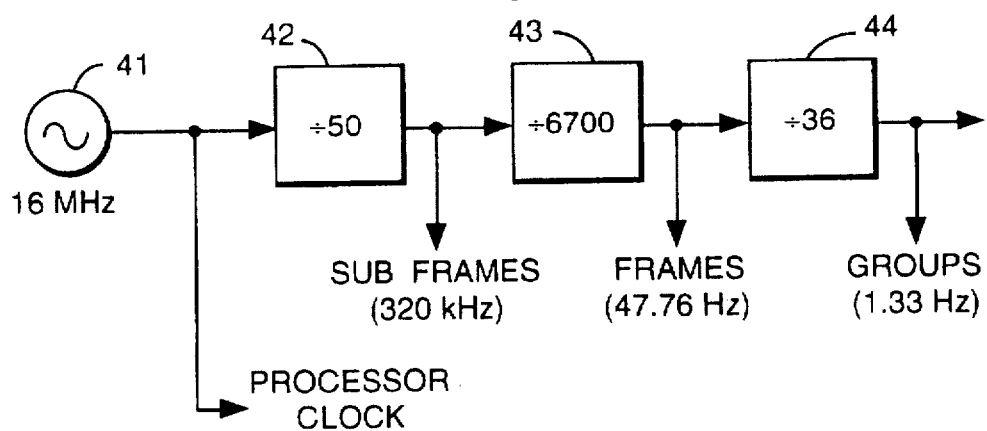
FIG. 4 shows a system clock along with counters for reducing the frequency of pulses generated by the clock.

The mobile telephone includes an accurate system clock arranged to produce clocking signals at 16.8 megahertz. Internal circuitry within the mobile telephone, including a digital signal processing circuit, receives these processor clock signals directly and executes instructions in response to these signals. Timing signals, to identify the start of sub-frames, frames and super frames, are generated by counting system-clock signals in a cascaded chain of counters or frequency dividers. Such a chain is illustrated in FIG. 4.

An output from a system clock 41 at 16.8 megahertz is supplied to a first frequency divider 42 arranged to divide the system clock's frequency by 50. Thus, the first counter 42 produces sub-frame clocks at 336 kilohertz, each identifying the start of a sub-frame period, as identified in FIG. 3. The output from counter 42 is also supplied to a second counter 43, arranged to divide the clock frequency by 6720. Referring to FIG. 3, it can be seen that each frame is made up of 6720 sub-frame periods, therefore the output from counter 43 produces clocking signals at the frame rate of 50 hertz. Similarly, the output from counter 43 is supplied to a third counter 44, arranged to divide the clocking frequency by 36, to produce superframe clocks at 1.38 hertz.

At any particular instance, the output from counters 42, 43 and 44 identifies a particular sub-frame period, within a particular frame of a superframe. These values are also compared with reference signals received from base stations and, where appropriate, modifications are made to the values stored within the counters so as to bring the operation of the mobile telephone accurately into phase with network clocks. Thus, during each superframe cycle, the mobile telephone may compare its internal clocking signals with network clocks, to ensure that the operation of the mobile telephone is accurately synchronised to the network.

When placed in its stand-by condition, the system clock and much of the processing circuitry may be de-activated for substantial portions of each superframe, provided that circuitry is re-activated so as to be ready to receive polling information during frame 23. These polling bursts are illustrated diagrammatically in FIG. 5. Each polling burst 51 represents a period during which the telephone must be active and capable of receiving and analysing information transmitted during the polling burst. At other times, during intervals 52, it is not necessary for the telephone to communicate with base stations, given that no polling information is transmitted. However, the telephone may be required to perform other processing operations, therefore it will be necessary for the telephone to remain active after the transmission of the polling burst. Similarly, the operation of the telephone must have stabilised prior to the polling burst being transmitted, therefore it is necessary for the telephone to be activated before the polling burst is transmitted.

Periods during which a telephone must be placed in an active condition are illustrated as active periods 53. Each active period 53 starts at a predetermined interval before a polling burst 51. The telephone remains active throughout the transmission of the polling burst 51 and may then de-activate after processing has been completed. Thus, between each active pulse 53 a duration is provided, identified as duration 54, during which the system clock may be de-activated, effectively placing the telephone into a sleep condition.

It can be appreciated from FIG. 5 that the duration of the active intervals is variable, given that the degree of processing required by the telephone will also vary from cycle to cycle.

In order for the system clock to be de-activated, a lower frequency sleep clock is included, which may be calibrated with reference to the system clock. In previous systems, a routine is included which, during each active period 53, calculates the duration of the subsequent sleep period 54. A system clock may then be de-activated and the system placed in its sleep condition for the appropriate duration 54, as measured by the low frequency sleep clock.

In the present embodiment an improved approach is provided to placing the system clock into its sleep condition. As previously stated, the sleep durations 54 are variable and the optimum point at which the system clock may be placed in its sleep mode will vary relative to the cycle phase. However, in the present embodiment, exploitation is made of the fact that the point at which re-activation is required does not need to vary with reference to the cycle phase. Thus, the duration of active pulses 53 is variable because the point at which de-activation occurs varies with reference to the cycle phase. However, it can be noted by comparing activation periods 53 with polling burst 51, that the optimum reactivation point does not vary with reference to the cycle phase. Thus, in preference to calculating variable sleep durations for each sleep cycle, an activation periodicity 55 is calculated.

The sleep clock is calibrated with reference to the cycle clock, preferably on each cycle. Thus, the sleep clock is now arranged to calculate durations representing the periods between re-activation points. For each cycle, circuitry is included which counts a predetermined number of sleep clock pulses, so as to produce a re-activation pulse at the required point within each cycle. Thus, the processor is arranged to effect a de-activating routine after completing the processing required for that particular cycle. In this way, de-activation occurs at the optimum point and, as part of the cycle processing, it is not necessary to calculate a sleep duration. Re-activation then occurs at the predetermined position within the repeated cycle in anticipation of receiving polling signals. Thus, re-activation occurs prior to the polling burst being transmitted, allowing the circuitry to power up and stabilise.

What is claimed is:

1. A mobile telephone having a high frequency system clock and processing means, wherein said processing means is arranged to process polling signals received during a predetermined portion of a repeated periodic cycle, comprising:

means for de-activating said system clock after completing cycle processing, said cycle processing occurring during a cycle processing interval having a variable duration, and means for re-activating said system clock at a predetermined position within said repeated periodic cycle in anticipation of receiving polling signals, said means for re-activating operating without regard for the duration of said cycle processing interval.

2. A mobile telephone according to claim 1, wherein said system clock oscillates at a frequency of between 5 megahertz and 20 megahertz.

3. A mobile telephone according to claim 1, wherein polling signals are received during a predetermined frame of a superframe multiplex.

4. A telephone according to claim 3, wherein each superframe includes from ten to fifty frame periods.

5. A telephone according to claim 4, wherein each frame period includes time allocation for transmission and time allocation for reception.

6. A telephone according to claim 1, wherein the system clock is de-activated when the telephone is in a stand-by condition ready to receive incoming calls.

7. A telephone according to claim 1, wherein the predetermined position within the repeated periodic cycle is determined with reference to a low frequency sleep clock.

8. A telephone according to claim 7, wherein a predetermined number of sleep clock pulses are counted to produce re-activation signals.

9. A telephone according to claim 7, wherein the sleep clock is calibrated with reference to the system clock and with reference to timing signals received from base stations.

10. A method for use in a mobile telephone of a type that comprises a system clock and a data processor coupled to the system clock, the data processor operating to periodically process polling signals during a polling signal processing interval, the polling signals being received during a predetermined portion of a repeated periodic cycle, comprising steps of:

de-activating the system clock at a termination of a polling signal processing interval, the polling signal processing interval being capable of having a duration that differs from a duration of a previous polling signal processing interval; and re-activating the system clock at a predetermined position within the repeated periodic cycle prior to the receipt of a next polling signal to be processed, wherein the step of re-activating operates to re-activate the system clock without regard for a time that the previous polling signal processing interval was terminated.

11. A method according to claim 10, wherein the system clock oscillates at a frequency of between about 5 megahertz and about 20 megahertz.

12. A method according to claim 10, wherein polling signals are received during a predetermined frame of a superframe multiplex, and wherein each superframe includes from ten to fifty frames.

13. A method according to claim 12, wherein each frame includes a reception portion and a transmission portion.

14. A method according to claim 10, wherein the polling signal processing interval occurs when the telephone is in a stand-by condition ready to receive incoming calls.

15. A method according to claim 10, wherein the predetermined position within the repeated periodic cycle is determined with reference to a sleep clock having a lower frequency that the system clock.

16. A method according to claim 15, wherein the step of re-activating includes steps of:

counting a predetermined number of sleep clock pulses; and generating a system clock re-activation signal after a predetermined number of sleep clock pulses have been counted.

17. A method according to claim 15, and further comprising a step of calibrating the sleep clock with reference to the system clock and with reference to timing signals received from an external transmitter.

18. A mobile telephone having a system clock that drives a data processor, wherein said data processor processes polling signals received during a predetermined portion of a repeated periodic cycle, comprising:

means for de-activating said system clock and said data processor after completing cycle processing, said cycle processing occurring during a cycle processing interval having a variable duration; and means for re-activating said system clock and said data processor at a predetermined position within said repeated periodic cycle in anticipation of receiving polling signals, said means for re-activating being synchronized to said repeated periodic cycle and operating without regard for the duration of said cycle processing interval.

* * * * *